US011347375B2

(12) United States Patent
Bar-On et al.

(10) Patent No.: US 11,347,375 B2
(45) Date of Patent: May 31, 2022

(54) DIGITAL TASK MANAGEMENT USING AN INTERMEDIARY SINGLE-ACCOUNT ISSUE INBOX SYSTEM

(71) Applicant: Atlassian Pty Ltd, Sydney (AU)

(72) Inventors: Noam Bar-On, San Jose, CA (US); Markus Te Grotenhuis, San Francisco, CA (US)

(73) Assignee: ATLASSIAN PTY LTD., Sydney (AU)

( * ) Notice: Subject to any disclaimer, the term of this patent is extended or adjusted under 35 U.S.C. 154(b) by 103 days.

(21) Appl. No.: 15/927,479

(22) Filed: Mar. 21, 2018

(65) Prior Publication Data

US 2019/0294303 A1 Sep. 26, 2019

(51) Int. Cl.
| | |
|---|---|
| *G06Q 10/06* | (2012.01) |
| *G06F 3/0482* | (2013.01) |
| *H04L 51/42* | (2022.01) |
| *G06F 3/0483* | (2013.01) |
| *H04L 67/306* | (2022.01) |
| *G06Q 10/10* | (2012.01) |

(52) U.S. Cl.
CPC .......... *G06F 3/0482* (2013.01); *G06F 3/0483* (2013.01); *G06Q 10/107* (2013.01); *H04L 51/22* (2013.01); *H04L 67/306* (2013.01)

(58) Field of Classification Search
CPC ........ G06F 16/24575; G06F 16/24578; G06F 3/0482; G06F 3/0483; G06Q 10/06; G06Q 10/06311; G06Q 10/063114; G06Q 10/06313; G06Q 10/0633; G06Q 10/1097; G06Q 10/107; H04L 51/22; H04L 67/306
See application file for complete search history.

(56) References Cited

U.S. PATENT DOCUMENTS

| | | | |
|---|---|---|---|
| 7,296,058 B2* | 11/2007 | Throop | G06Q 40/08 705/4 |
| 9,098,834 B2* | 8/2015 | Ramanathaiah | G06Q 10/107 |
| 2004/0133643 A1* | 7/2004 | Warren | H04L 69/08 709/206 |
| 2007/0282660 A1* | 12/2007 | Forth | G06Q 10/06311 705/7.15 |
| 2008/0065460 A1* | 3/2008 | Raynor | G06Q 10/06 705/7.21 |
| 2008/0077530 A1* | 3/2008 | Banas | G06Q 10/06 705/50 |
| 2008/0126951 A1* | 5/2008 | Sood | G06Q 10/107 715/752 |
| 2009/0100371 A1* | 4/2009 | Hu | G06Q 10/10 715/780 |

(Continued)

*Primary Examiner* — Wilson W Tsui
(74) *Attorney, Agent, or Firm* — Brownstein Hyatt Farber Schreck, LLP (57) ABSTRACT

Techniques are presented herein for digital task management using an intermediary single-account issue inbox system. The techniques include receiving an email message related to a task, creating a task item related to the email message and assigning an initial digital state to the task item, adding the task item to a list of task items stored in the shared issue tracking system causing display of the list of task items that are associated with one digital state value, and enabling users to input state-change information, and in response to those requests, changing those states in the issue ticket system.

20 Claims, 8 Drawing Sheets

(56) References Cited

U.S. PATENT DOCUMENTS

| | | | |
|---|---|---|---|
| 2009/0119133 A1* | 5/2009 | Yeransian | G06Q 40/08 705/4 |
| 2010/0100778 A1* | 4/2010 | Sullivan | H04L 12/00 714/57 |
| 2010/0198927 A1* | 8/2010 | Tonnison | G06Q 10/107 709/206 |
| 2011/0066559 A1* | 3/2011 | White | G06Q 10/00 705/304 |
| 2011/0131285 A1* | 6/2011 | Liao | G06Q 10/1097 709/206 |
| 2012/0011239 A1* | 1/2012 | Svane | G06Q 10/10 709/223 |
| 2012/0151377 A1* | 6/2012 | Schultz | G06Q 10/103 715/751 |
| 2013/0090976 A1* | 4/2013 | White | G06Q 10/20 705/7.27 |
| 2013/0191836 A1* | 7/2013 | Meyer | G06F 9/4881 718/103 |
| 2013/0282418 A1* | 10/2013 | Furman | G06Q 10/10 705/7.13 |
| 2014/0081691 A1* | 3/2014 | Wendell | G06Q 10/063114 705/7.15 |
| 2017/0085520 A1* | 3/2017 | Umapathy | G06Q 10/107 |
| 2018/0204167 A1* | 7/2018 | Rayner | G06Q 10/063114 |

\* cited by examiner

DIGITAL TASK MANAGEMENT USING AN INTERMEDIARY SINGLE-ACCOUNT ISSUE INBOX SYSTEM

FIELD OF THE INVENTION

The techniques described herein relate to digital task management, and in particular to digital task management using an intermediary single-account issue inbox system.

BACKGROUND

Electronic mail ("email") is the most prominent communication and collaboration tool. Although there are alternatives such as collaborative documents and chat apps, the fact remains may use email as their main working tool. Email is used for more than it is capable, however. Many use email for much more than just sending and receiving messages. They use emails to save links, set reminders, arrange and save tasks, keep notes and more. Classic email clients are not designed to support these requirements. For example, email is often used by owners of email accounts to keep track of to do lists, items to follow up on, etc. Email is not well-suited to such uses. Account users may mark messages as unread to indicate that they should follow up on an item and/or add an item to a to do list. Such an approach to task management is cumbersome at best, and will usually spiral out of control, resulting in hundreds, thousands, or possibly tens of thousands of email messages to be marked unread.

Some email systems allow users to apply labels to email messages. Such a process involves manually typing in labels names and manually applying labels to the messages. This can be quite cumbersome for the user and will likely result in one of two outcomes. First, the user may be frustrated with the overhead associated with labelling the email messages, and may therefore cease use of the labels, reverting to marking messages as unread, which has the issues discussed above. Second, if the user does put in the time and energy to create the labels for all of the messages, then the outcome could still be the same as above, with hundreds, thousands, or tens of thousands of messages being labeled for follow up, etc.

The techniques described herein address these issues.

The approaches described in this section are approaches that could be pursued, but are not necessarily approaches that have been previously conceived or pursued. Therefore, unless otherwise indicated, it should not be assumed that any of the approaches described in this section qualify as prior art merely by virtue of their inclusion in this section.

SUMMARY

The attached claims serve as a summary of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

The techniques herein are generally directed to a system that allows users of an account to manage incoming electronic mail messages using the workflow capabilities of an issue tracking system. Issue tracking systems are discussed extensively elsewhere herein. In some embodiments, the techniques include a shared issue tracking system, which may store shared states of issues being tracked, as well as a single "project" that stores the single-account issue tracking system tickets, which may, in turn, store the information for that account's view of incoming task items, messages, etc. For example, the intermediary single-account issue inbox system may be a single project, identified by a project identifier, in the shared issue tracking system, and that single project may just be accessible by only a single member account. The other portions of the issue tracking system (the "shared issue tracking system") may be in the same issue tracking system as the intermediary single-account issue inbox system's tickets but have projects that are accessible by more than just the single account.

In some embodiments, an email server sends, and the intermediary single-account issue inbox system receives email messages. Once received by the intermediary single-account issue inbox system, the email message is added as a task item to a list of task items for the user account and the added task item is associated with an initial state value. Task items may be associated with digital state values, such as the initial state value, as well as a worklist state value, a follow up state value, and an archive state value. These are discussed more below.

When requested, a list of task items associated with a particular digital state value is presented (e.g. as part of a digital user interface) for the user account. This could be a list of tasks with the initial state value (those received and not yet moved to another states, which could be called a "feed" or "inbox"), or those with any other digital state value (e.g., those with the follow up state value, "the follow up list", those with the worklist state value, "the worklist" or "to do list", etc.).

In some embodiments, when a user interaction to change the state of a task item is received, that task item can have a new digital state value associated with it. For example, a user interaction may indicate that the digital state may be moved from the initial state to the worklist state (to add the task item to the worklist or "to do" list), to a follow up state (to add the task item to the follow up list), or to archive the item. The digital state for that task item can then be changed at the shared issue tracking system. The next time a list is requested, the task item will be displayed based on the updated digital state. In some embodiments, the state change is sent to the shared issue tracking system, which will receive the state change information and update the digital state in shared issue tracking system storage.

In some embodiments, the shared issue tracking system and intermediary single-account issue inbox system are separate programs running on separate hardware. In some embodiments, however, the two could be running on the same hardware or computing devices. For example, as described elsewhere herein, the tickets for the intermediary single-account issue inbox system may be differentiated from the rest of the shared issue tracking system by the use of project identifiers for tickets or task items within the issue tracking system—and the project in the shared issue tracking system for the intermediary single-account issue inbox system may only be accessible by the account associated with the intermediary single-account issue inbox system. The shared issue tracking system may also run on the same issue tracking system and have project identifiers that are accessible by more than the single account.

Numerous embodiments are described herein that provide additional benefits, but the techniques herein, as described above and elsewhere herein provide the benefit of providing an email-like interface for incoming task items, while providing a workflow for task items, easy accessibility of items that remain to be completed, and the ability to archive items that are completed.

Figure 1:
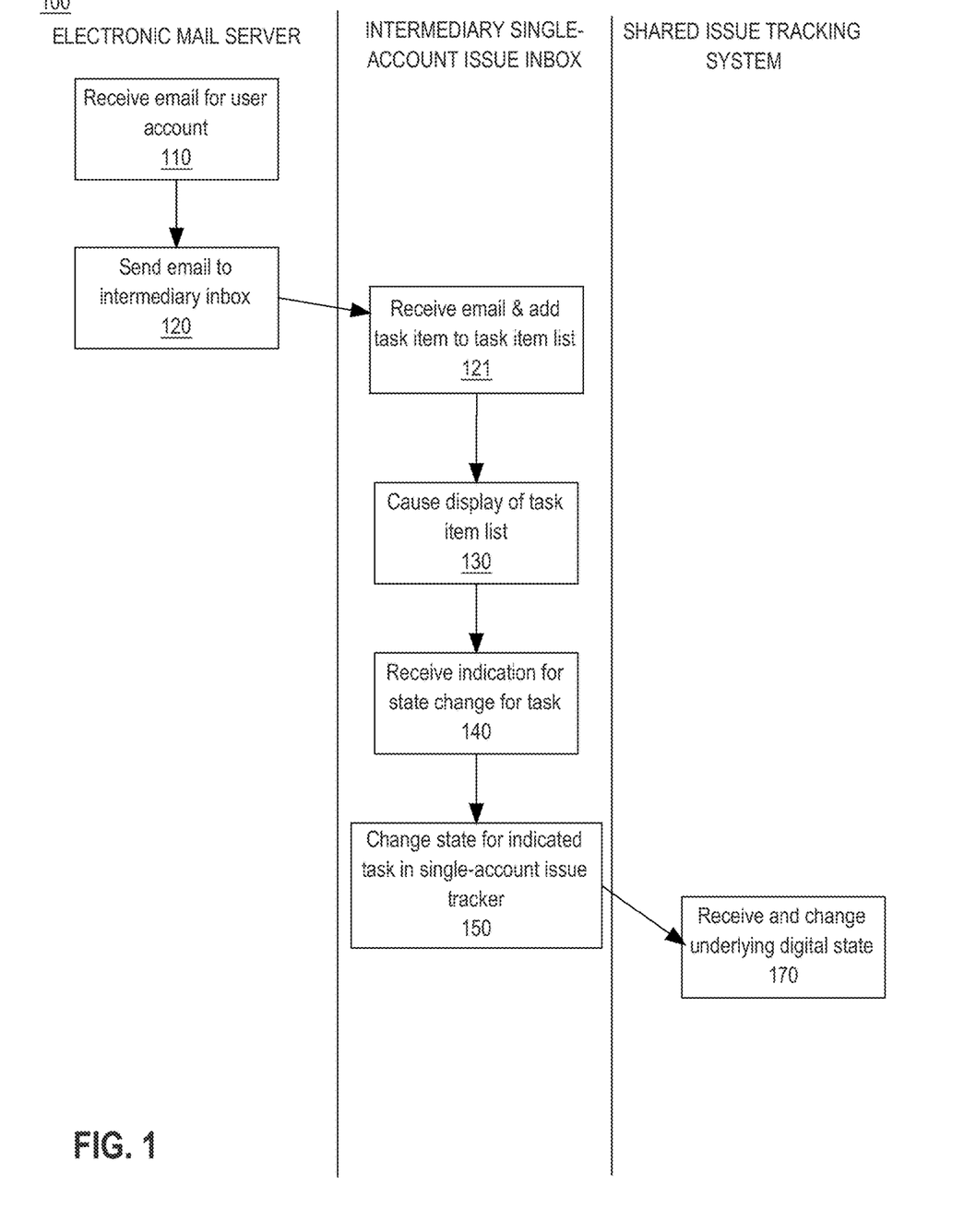
FIG. 1 depicts an example process for digital task management using an intermediary single-account issue inbox system.

Example Processes for Digital Task Management Using an Intermediary Single-Account Issue Inbox System FIG. 1 depicts an example process 100 for digital task management using an intermediary single-account issue inbox system. Although not required in all embodiments, the process 100 depicts three systems interacting using the techniques described herein: an electronic mail server, an intermediary single-account issue inbox system, and a shared issue tracking system. These three systems may all run on a single computer, server, or one or more computing devices. In some embodiments, the three systems are those depicted in FIG. 2 as the electronic mail server 250, intermediary single-account issue inbox system 210, and shared issue tracking system 230.

Generally, process 100 proceeds by receiving 110 an email for a user account and sending 120 that email to the intermediary single-account issue inbox system. The intermediary single-account issue inbox system receives the email and adds 121 a task item to a task item list. Although there are exceptions as discussed herein, generally, the task item will be associated with an initial state value. Not depicted in FIG. 1, a user device associated with a user account may request a list of task items associated with a particular digital task value (e.g., those with the initial state value, the "feed" or "inbox"). Then the intermediary single-account issue inbox system will cause display 130 of the list of task items associated with that digital state value. The intermediary single-account issue inbox system may then receive 140 an interaction to change in digital state for a task items in the list of task items. The intermediary single-account issue inbox system will then change 150 the digital state (at an intermediary single-account issue inbox system storage) for that task item by sending the state change information to a shared issue tracking system. The shared issue tracking system will receive the state change information and change 170 an underlying digital state value at a shared issue tracking system storage.

Returning to the top of process 100, the email server receives 110 an email for a user account. Receiving the email may include receiving an incoming message via Simple Mail Transfer Protocol (SMTP), Post Office Protocol (POP), and/or Internet Message Access Protocol (IMAP), and designating the user account as the recipient. The email message may have digital content, such as a sender email and/or name, a textual message, one or more attachments, and the like. In some embodiments, the message may include one or more suggested digital states for the message. The use of these suggested digital state is discussed below.

The received email is then sent 120 from the electronic mail server to the intermediary single-account issue inbox system. Sending the message may include, for example, placing the message in a shared memory (if the email server and the shared issue tracking system have access to the same shared memory) and/or sending the electronic message using a communication protocol such as IMAP, POP, and/or SMTP.

The intermediary single-account issue inbox system receives the email and adds 121 a task item for the digital message to a task item list. In some embodiments, every task item that is added to a task item list is associated with an initial state value as its digital state value. In some embodiments, the digital task item may be initially assigned a suggested digital state value, where the suggested digital state value may be indicated by the sender of the email message. In some embodiments, the suggested digital state for the task item (if the embodiment provides for such a suggestion, and the sender has suggested a digital state value) is suggested on the user interface, which is discussed more with respect to causing display 130 of the task item list.

In some embodiments, adding 121 the task item to the list of task items may include creating a ticket (or "issue") in the shared issue tracking system, and creating the task item may include copying the information from the incoming message into the ticket (e.g., a work item) in the shared issue tracking system and marking the digital state of the ticket with a digital state such as the initial state value. The ticket may be stored in non-transitory computer readable media coupled to the shared issue tracking system. Creating the task items form the email may include mapping or computing some or all of the data from the email message to a task item (e.g., sender, recipient, text for the message, any attachments, etc.) and adding any necessary information (e.g., digital state value, etc.). For example, the "to" field may be mapped to the assignee in the underlying ticket. In some embodiments, the incoming email could have integrations with other federated programs (e.g., a source code repository), and the incoming email could have links to source code, and those links could be included in the task items.

Figure 6:
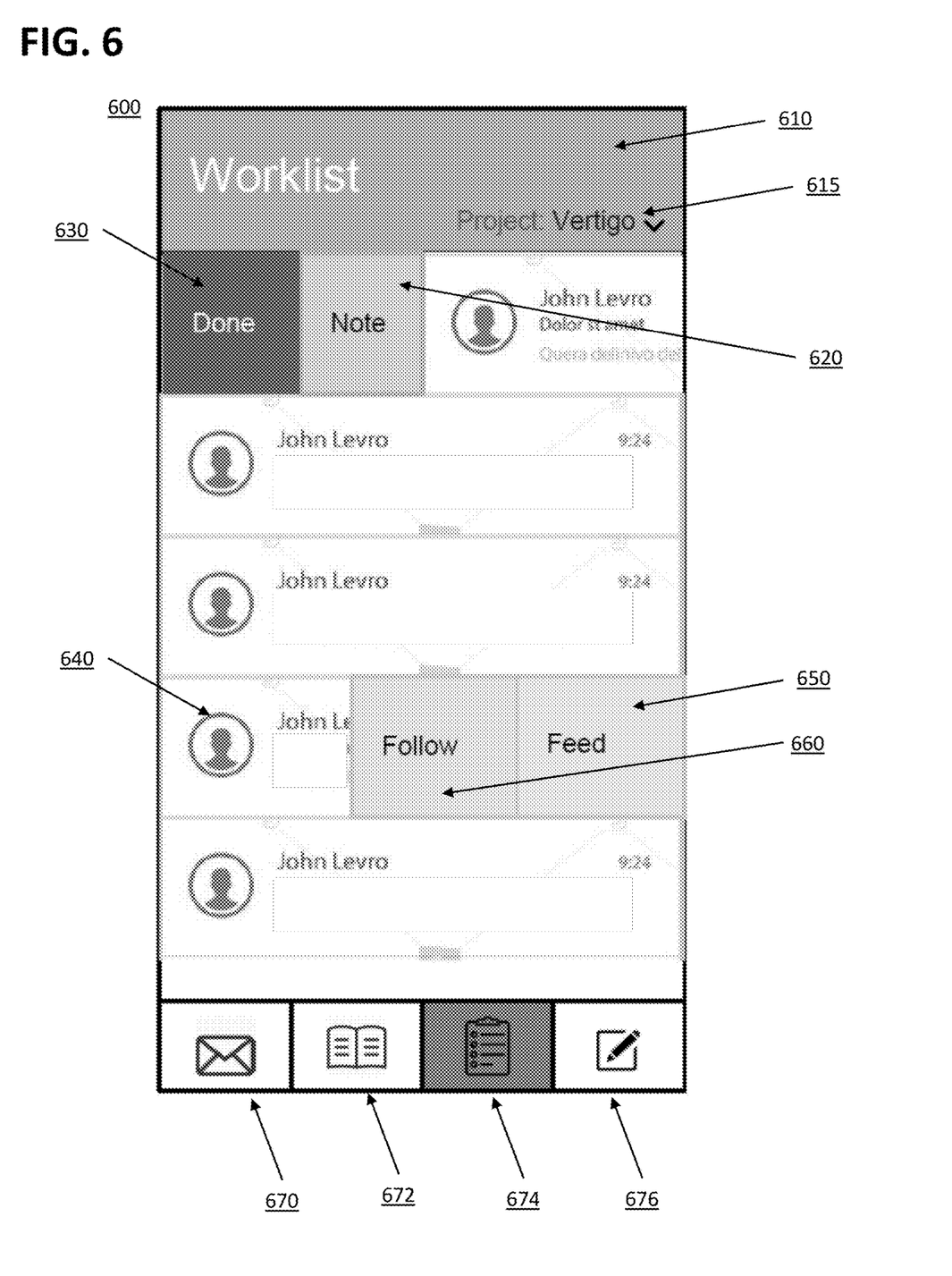

In some embodiments, adding 121 a task item to the list of task items in the intermediary single-account issue inbox system includes adding an indication of a project identifier with the ticket (or work item) in the shared issue tracking system. For example, the incoming message may have an indication of a project name (e.g., in the title or body of the incoming email). That project name may be stored as the project name for the ticket in the shared issue tracking system. In some embodiments, not depicted in FIG. 1, a user using a user interface may indicate a project name for the task item and that may be stored with the ticket in the shared issue tracking system, either as part of adding 121 the task item, or thereafter. In some embodiments, all of the items associated with the single account may be stored in a single project in the shared issue tracking system, and the project identifier in the message may be a sub project name or sub label (sometimes called an "epic"). In some embodiments, the project identifier associated with a task item (e.g., project identifier element 615 in user interface 600) may be a project identifier from the shared issue tracking system.

Not depicted in FIG. 1, the intermediary single-account issue inbox system may receive a request from a user device associated with the single user account to show a list of task items, and that request may include a particular digital state for to which to limit the digital task items displayed. In some embodiments, based on this request, the intermediary single-account issue inbox system causes display 130 of the list of task items associated with the requested digital state. The request may also or instead include an indication of a project identifier to which to limit the list. The intermediary single-account issue inbox system may query for all tickets or work items in the shared issue tracking system storage that have the particular digital state and/or project. Relatedly, in some embodiments, the request to see the list of task items is initiated by the opening of a user interface or launching of an application on a user device for the single account. Such launching may send a request for a list of task items associated with the initial state value.

The intermediary single-account issue inbox system will cause display 130 of the list of task items in the particular digital state. For example, the intermediary single-account issue inbox system (for example, if coupled to a display for the user device) may display the list on the display of the user device. The intermediary single-account issue inbox system may send the list in formatted (e.g., in XML, JSON, HTML, or other format) form to the user device, and that may cause the user device to display the list. Numerous example embodiments of user interface are discussed elsewhere herein. Further, as discussed elsewhere herein, the user interfaces may allow for filtering, sorting, and creation of new task items.

The intermediary single-account issue inbox system may receive 140 an indication of a state change from the current to another state. For example, if a user device is displaying the list and has one or more controls for indicating state change (discussed elsewhere herein), then the user device may send those user interface indications of state change to the intermediary single-account issue inbox system, which will then receive 140 the indications.

In some embodiments, the states can change from any of four digital state values (initial state value, follow up state value, worklist state value, and archived state value) to any other of the four digital state values. For example, if a user were to want to move a task item from the "feed" (e.g., a name for the display of the list of task items with a digital value of initial state value) to a list for follow up, then the user could indicate on a user interface to change the digital state value associated with the item to the follow up state value. Stated another way, the following transitions of digital value are possible:

Initial state value→Follow up state value
Initial state value→Worklist state value
Initial state value→Archive state value
Follow up state value→Follow up state value
Follow up state value→Worklist state value
Follow up state value→Archive state value
Worklist state value→Follow up state value
Worklist state value→Initial state value
Worklist state value→Archive state value
Archive state value→Follow up state value
Archive state value→Initial state value
Archive state value→Worklist state value Based on the received 140 indication of state change, the intermediary single-account issue inbox system will change 150 the state of the task item as indicated. Changing the state for the task item may include changing 170 a state in the shared issue tracking system for the ticket associated with the digital task item. For example, if the task item is being moved from an initial state to a follow up state, then the digital state for the ticket associated with the digital task item (e.g., in the shared issue tracking system ticket) may be changed from the initial state value to the follow up state value. In some embodiments, a task item can have more than one digital state, and changing 150 the state value of a task item comprises keeping the current state value as well as adding the new state value. For example, a task item may have a follow up state value. An indication may be received to add to that task item a worklist state value. Based on receiving that indication, the techniques may include keeping the follow up state value and adding the worklist state value to the task item.

In some embodiments, when a task item is moved to an archive state, the ticket associated with the task item may be removed from the shared issue tracking system and a digital communication could be sent back to the sending email server to delete the original email message, and the associated ticket in the shared issue tracking system may be deleted.

As noted above, in some embodiments, the indication of the state change is sent to the shared issue tracking system. The shared issue tracking system will receive the state change information and may change 170 a digital state for a corresponding ticket in the shared issue tracking system to reflect the state value change.

Some embodiments include the ability to run reports on the intermediary single-account issue inbox system. Such reports may include the number of task items completed (e.g., archived from the worklist) over a particular time period. In some embodiments, for example, each task item may have an associated time estimate or deadline, and the reports may include how well the account holder has done against those time estimates.

Figure 4:
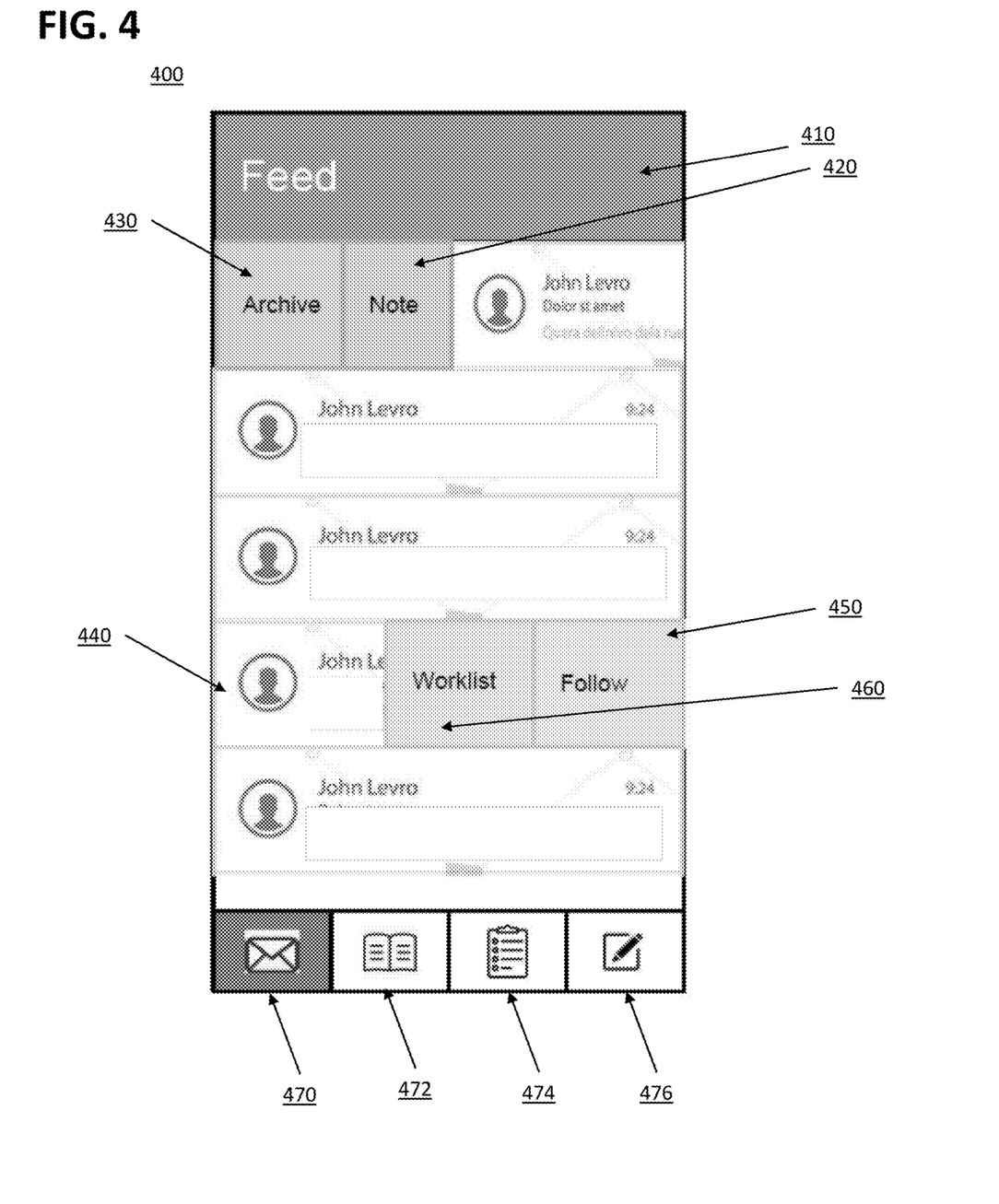
FIG. 4, FIG. 5, FIG. 6, FIG. 7, and FIG. 8 depict example user interfaces for digital task management using an intermediary single-account issue inbox system.

Example User Interfaces and Underlying Technology for Digital Task Management Using an Intermediary Single-Account Issue Inbox System FIG. 4 depicts a user interface 400 for digital task management using an intermediary single-account issue inbox system. The user interface includes a header 410 that indicates that the list of task items in the initial state is being displayed (called "Feed" in the user interface). For any given selected task item, such as task item 440, the user interface 400 includes selectable or actionable interface elements to allow the user to elect to move the task item 440 to a worklist state (selectable element 460), or to a follow up state (selectable element 450). At the top of the user interface 400 is a selectable element 430 the selection of which indicates a move of the selected task item 440 to an archive state. In some embodiments, moving a task item to a particular state comprises setting the digital state value to the corresponding value. For example, moving task item 440 to a follow up state may comprise setting the digital state value for the ticket with the task item in the shared issue tracking system associated to the follow up state value.

User interface 400 also includes selectable interface elements (depicted on the bottom of user interface 400 as element 470-474) that allow for selection of display of task items in particular states. For example, selection of selectable element 470 will cause display of list items in the initial state, selection of element 472 will cause display of task items in the follow up state, selection of element 474 will cause display of the task items in the worklist state. In some embodiments, selection of element 476 will cause a new user interface to appear to allow creation of a new task item.

User interface 400 includes a selectable element 420 that will allow for inputting a note (which may also be termed as an intermediary digital message) to attach to the selected task item 440. Not depicted in user interface 400, when selectable element 420 is selected, a text input window will appear and allow for insertion of text that will be associated with the task item 440. In some embodiments, not depicted in FIG. 4, when element 420 is selected, it will display the notes that have already been attached to task item 440. In some embodiments, notes for a task item are only shown to the user account associated with the task item 440. Further, the notes may be stored locally in the shared issue tracking system and associated with the task item 440 and not sent to the shared issue tracking system as part of process 100.

Figure 5:
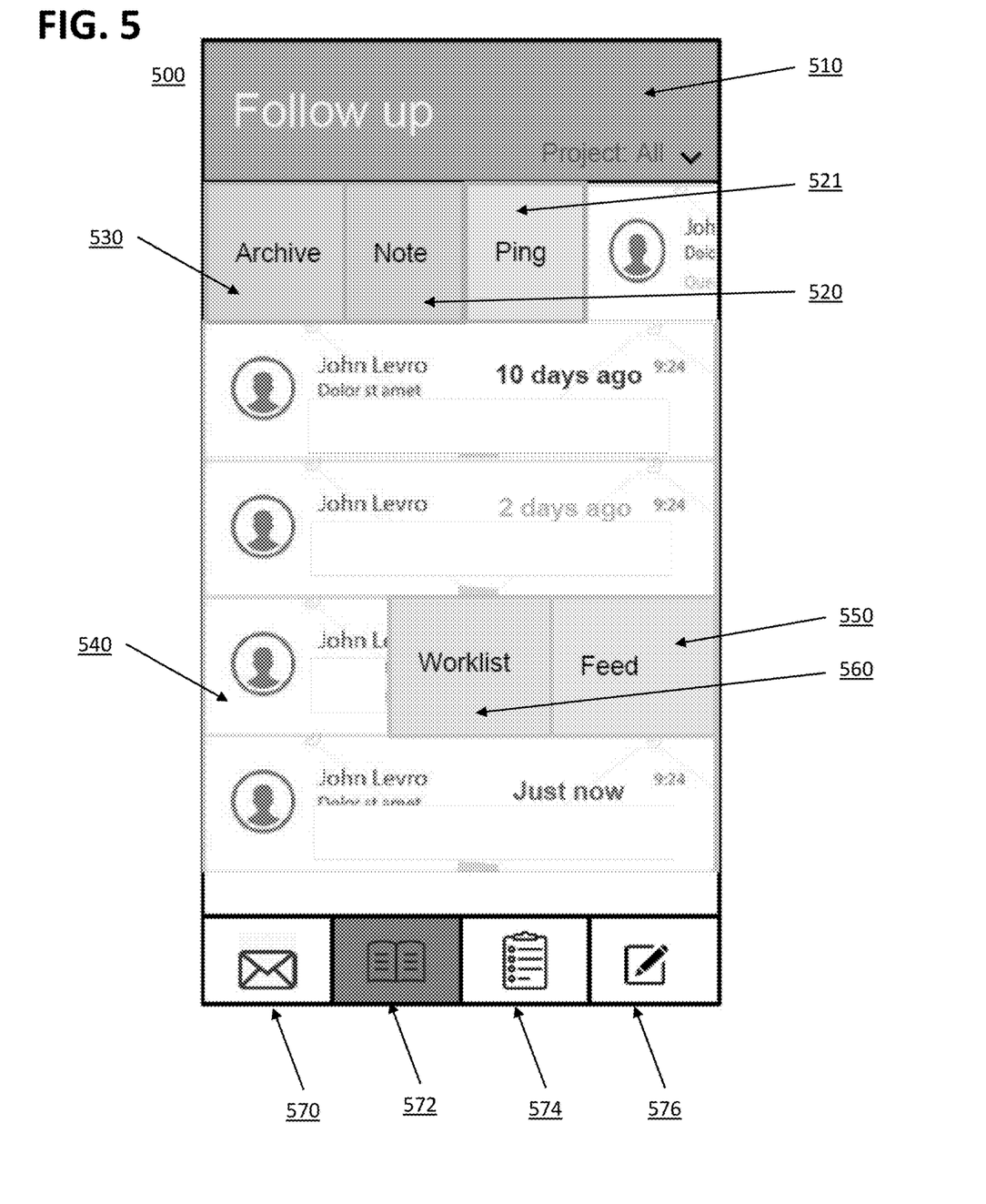

FIG. 5 depicts a user interface 500 for digital task management using an intermediary single-account issue inbox system. User interface 500 has a header 510 indicating that the task list depicted is for follow up, and likewise that the task items displayed have a digital state value of follow up value. Like user interface 400, user interface 500 includes selectable interface elements 530, 550, 560 that allow indication to move a task item 540 to the archive state (selectable element 530), worklist state (selectable element 560), or initial state (selectable element 550). User interface 500 has selectable element 570-574 for changing the user interface from the current view to a view of the elements in the initial state (element 570), the follow up state (element 572), the worklist state (574), as well as a selectable element 576 that will allow for the creation of a new task item.

User interface 500 also has a selectable user interface element 521 that, when selected, will send an email message (termed "ping" in the user interface) to an appropriate party to request information on the item. For example, consider task item 540, which may have been sent by John L. When element 521 is pressed, the intermediary single-account issue inbox system may send a message to John L. inquiring re the status. In some embodiments, the email status request message is sent automatically. In some embodiments, the email status request message is drafted and presented on a user interface for review before it is sent. The email status request message may read as a reply to John L.'s original message and have additional text such as "Hi John, I just wanted to follow up on this item. Can you let me know where things stand?"

In some embodiments, (not depicted in FIG. 5), the user interface(s) may include an ability to rank or sort messages. For example, user interface 500 has task items sorted from oldest (10 days) to youngest ("just now"). In some embodiments, there may be a selectable user interface element that allows for sorting of the user task items by data (oldest or youngest first) as well as other factors, such as alphabetically, by latest or oldest "ping", and the like. In some embodiments, not depicted in FIG. 5, priorities can be assigned in the user interface and sorting can be done based on priority.

FIG. 6 depicts a user interface 600 for digital task management using an intermediary single-account issue inbox system. User interface 600 has a header 610 that indicates that the task items displayed have a digital state value of worklist state value. User interface 600 has a selectable element 630 (pictured with text "Done") that will set the selected task item 640 to the archive state. Similar to user interface 400, user interface 600 has a selectable element 620 for drafting and/or displaying notes for task item 640. User interface 600 has selectable elements 650 and 660 for changing the digital state of task item 640 to the initial state value and follow up value, respectively. User interface 600 also has selectable element 670-674 for changing the user interface from the current view to a view of the elements in the initial state (element 670), the follow up state (element 672), the worklist state (674), as well as a selectable element 676 that will allow for the creation of a new task item.

User interface 600 also includes a selectable element 615 that will enable filtering by project name. For example, the element 615, when selected, may display a list of project names, and when a particular project name is selected, only the task items associated with that project name may be displayed on the user interface 600.

Figure 7:
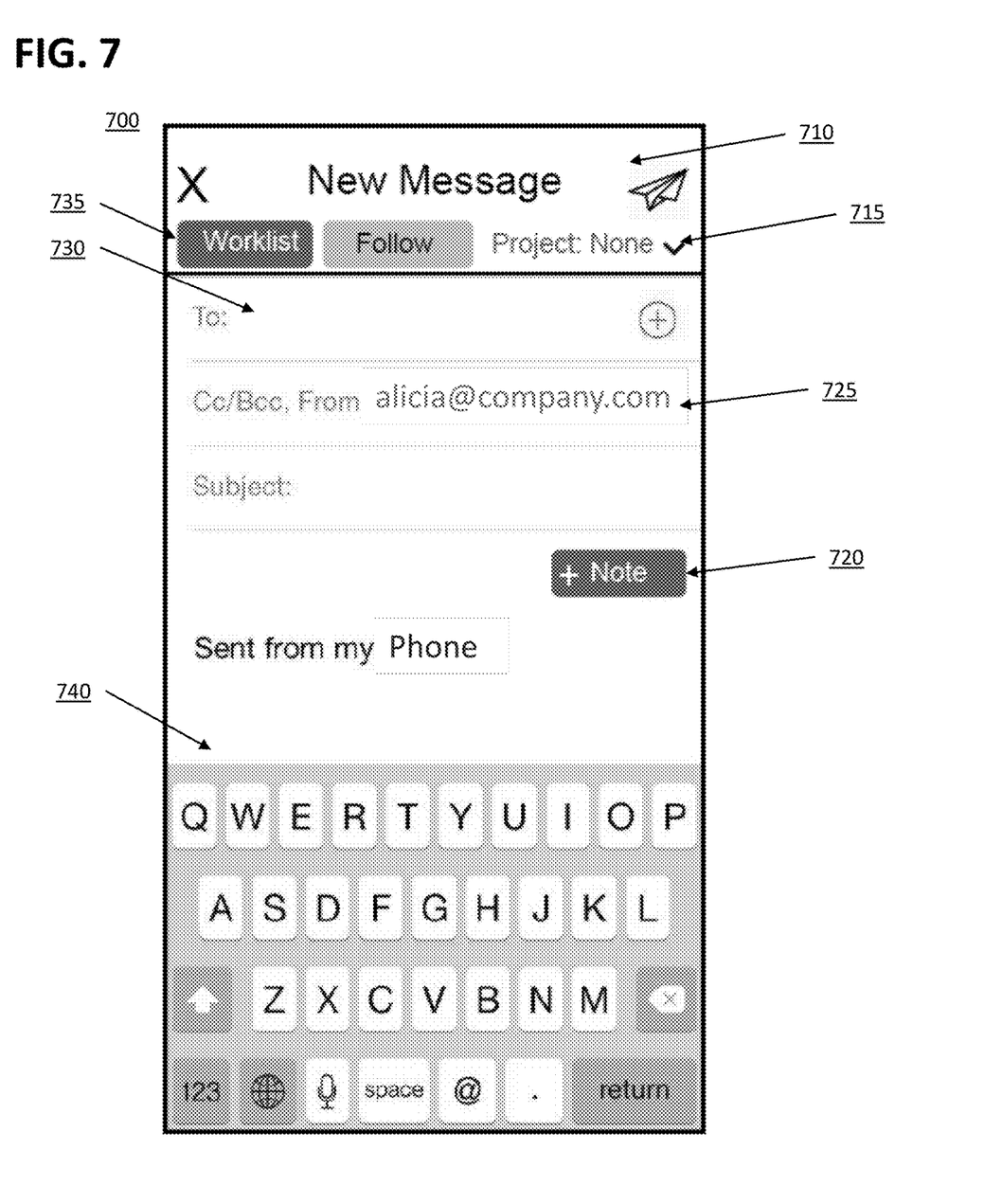

FIG. 7 depicts a user interface 700 for digital task management using an intermediary single-account issue inbox system. User interface 700 may include a header 710 indicating that the user interface 700 allows for creation of a new email message. Interface 700 includes selectable element 715 that allows for indication of the project to which the message being composed is associated. The interface 700 also includes one or more selectable elements 735 that allow for indication of which digital state value to associate with the message being composed. User interface 700 also include the "from" field 725, which may indicate the email address associated with the user account associated with the intermediary single-account issue inbox system. User interface 700 may also include a keyboard 740 for typing and/or speaking the message.

In some embodiments, the user interface 700 includes a "to" field 730 that will allow the input of an email address and/or name to which to send the message. In some embodiments, the to field 730 will auto populate with previously-used email address and/or email addresses associated with a particular project (as indicated by element 715).

In some embodiments, the user interface 700 includes a selectable element 720 to add a digital note (e.g., an intermediary digital message) to a message. This digital note (like note element 420 of user interface 400) may be only viewable by the user account associated with the intermediary single-account issue inbox system and may be imputable in a similar manner.

Figure 8:
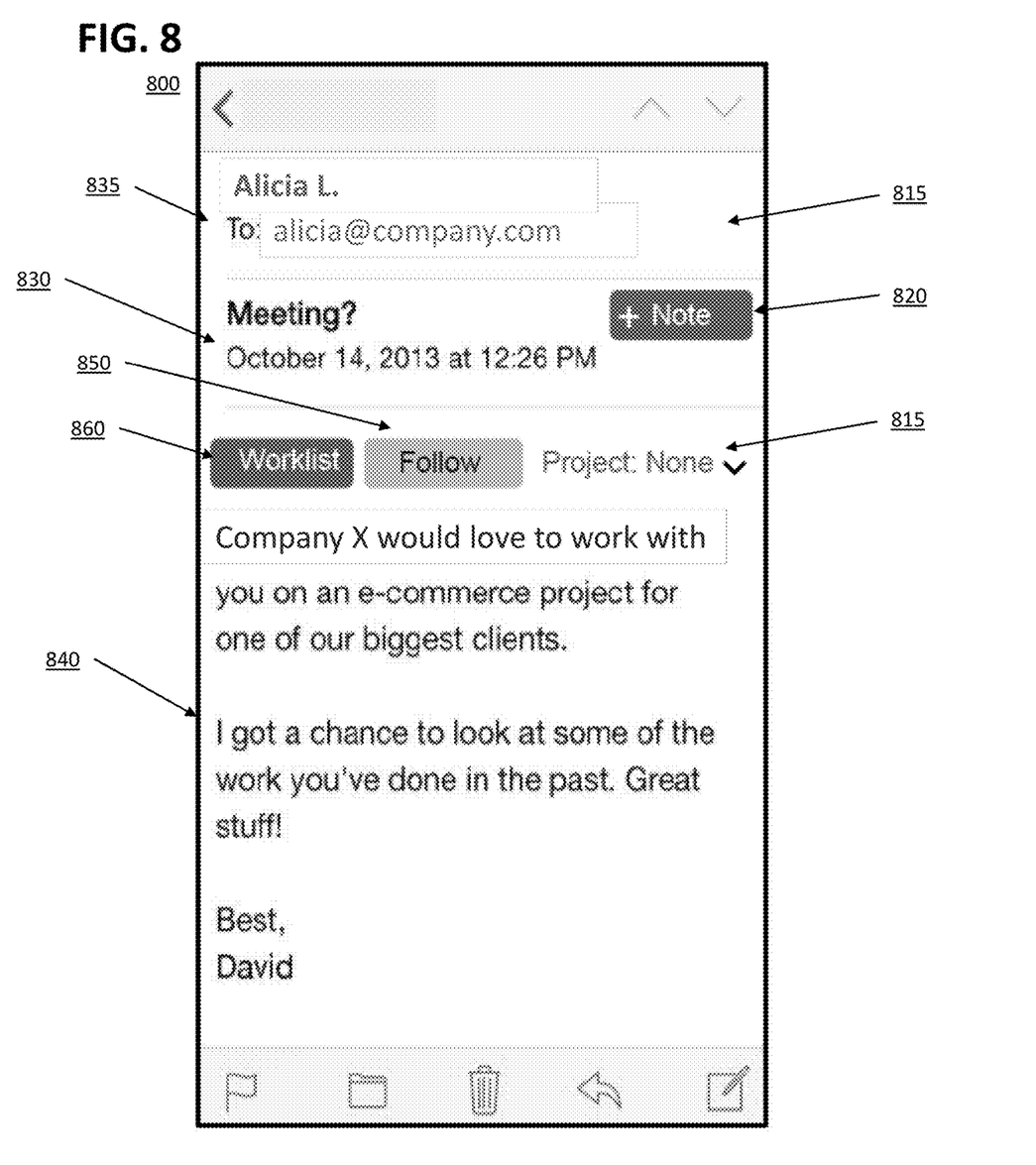

FIG. 8 depicts a user interface 800 for digital task management using an intermediary single-account issue inbox system. User interface 800 may show detail of a particular task item, which may be accessible by, e.g., selecting a task item from one of the other interfaces 400-700. User interface 800 includes the "to" field of the original task item, in this case the name and email associated with the user account associated with the intermediary single-account issue inbox system. User interface 800 includes a selectable element 820 that allows for adding a note to the task item in question, which may be similar to the way notes are added with selectable element 420. User interface 800 include a project selection element 815 that will allow the selection of project identifier in the intermediary single-account issue inbox system with which to associate the task item. In some embodiments, selectable elements 850 and 860 will allow the task item depicted in user interface 800 to be assigned the follow up value (element 850) and/or worklist value (element 860). In some embodiments, elements 850 and 860 are not selectable and are instead an indication that the task item depicted in user interface 800 has therewith associated both the worklist state value and follow up state value. User interface 800 may include a display of the title 830 of the task item as well as the message body 840 of the task item.

In some embodiments, not depicted in FIG. 4, FIG. 5, FIG. 6, FIG. 7, or FIG. 8, there is additionally an interface element to delete a task item. When a task item is deleted the corresponding ticket in the shared issue tracking system and/or the shared issue tracking system may be deleted.

Figure 2:
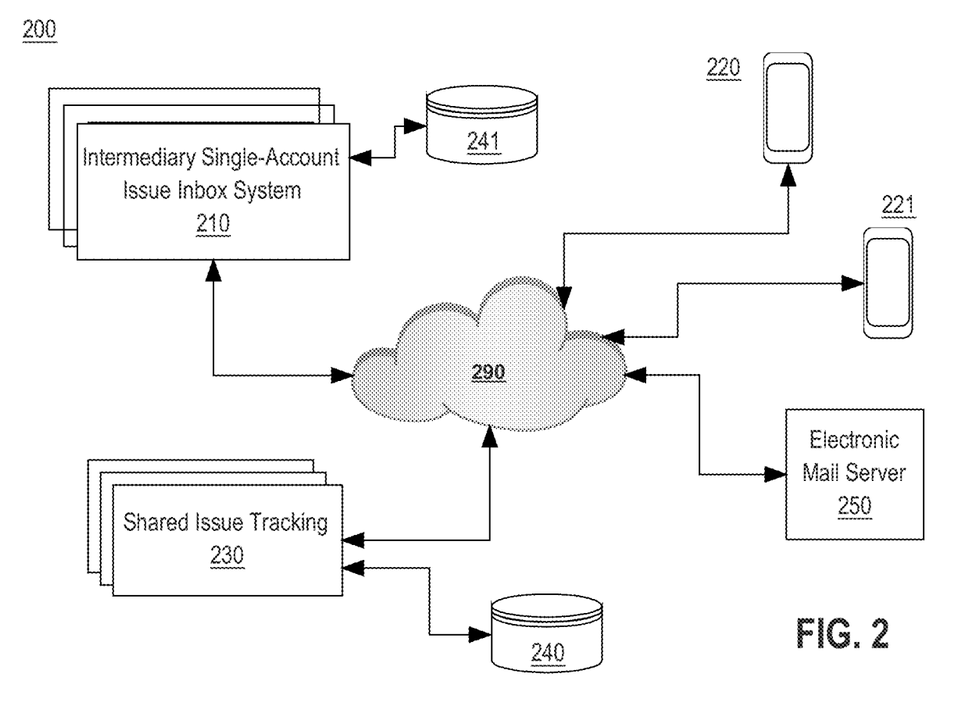
FIG. 2 depicts an example system for digital task management using an intermediary single-account issue inbox system.

System for Digital Task Management Using an Intermediary Single-Account Issue Inbox System FIG. 2 depicts an example system 200 for digital task management using an intermediary single-account issue inbox system. A shared issue tracking system 230, intermediary single-account issue inbox system 210, user devices 220 and 221, and electronic mail server 250 may all be coupled to a network 290 and be able to communicate via the network. Storage devices 240 and 241 are depicted as being directly coupled to intermediary single-account issue inbox system 210 and shared issue tracking system 230, respectively. Each could also be coupled to network 290 or may be part of intermediary single-account issue inbox system 210 or shared issue tracking system 230. Each of the devices 220 and 221, shared issue tracking system 230, electronic mail server 250, and intermediary single-account issue inbox system 210 may run as part of the same process and/or on the same hardware (not depicted in FIG. 2) or may run separately. Further, each may run on a single processor or computing device or on multiple computing devices, such as those discussed with respect to FIG. 3 and elsewhere herein.

As discussed elsewhere herein, the intermediary single-account issue inbox system 210 may be in communication with shared issue tracking system 230, electronic mail server 250, and devices 220 and 221 in order to perform its portion of process 100. The intermediary single-account issue inbox system 210 may store the task items in storage 241, or it may store the task items in another location, such as in the shared issue tracking system 230 or its storage 240. Shared issue tracking system 230 may store its shared tickets in storage 240 or elsewhere. The device 220 or 221 may be used to show the interfaces 400-800 and may allow for the interactions from the user accounts discussed herein.

Electronic mail server 250, intermediary single-account issue inbox system 210, and/or shared issue tracking system 230 or other servers (not pictured here) may run federated applications on to which the task items may relate. Federated application may include, but are not limited to, one or more of electronic mail servers or applications, chat servers or applications, other help ticket systems, video conferencing systems, resource control systems (e.g., a conference room booking system), blogging services, software code repositories, video content services (e.g., to show stored videos), and the like.

As discussed herein the process 100 may run in single or multiple instances, and run in parallel, in conjunction, together, or one process 100 may be a subprocess of another process 100. Further, any of the processes discussed herein, including process 100 may run on the systems or hardware discussed herein, including those depicted in FIG. 2 and FIG. 3.

Issue Tracking Systems

As used herein, the term "issue tracking system" ("ITS") generally refers to a system which can be used to track "issues" or, more generally, work items. Issue tracking systems are variously referred to a trouble ticket systems, support ticket systems, request management systems, and incident ticket systems. A work item is an item with associated information and an associated workflow—i.e. a series of states through which the work item transitions over its lifecycle. The workflow for a given work item may be simple (e.g. an open state and a closed state) or more complex (e.g. open, closed, resolved, in progress, reopened). The particular information and workflow associated with a work item may vary greatly depending on the scenario in which the ITS is implemented. By way of example, an ITS may be implemented in a helpdesk scenario, in which case the work items may be issues or tickets logged with the helpdesk. An ITS may be implemented in a project management scenario, in which case the work items may be project tasks. An ITS may be implemented in a software development scenario, in which case work items may be bugs, current features under development, and/or features intended for further development. An ITS may be implemented in an organizational administration scenario, in which case work items may be administrative forms (e.g. leave request forms or the like). Many other ITS implementations in which different work items are tracked through different lifecycles are possible. The embodiments herein will be described in relation to "issues". It will be appreciated, however, that the embodiments and principles thereof may be applied to different types of work items.

One embodiment may be implemented as part of an ITS such as JIRA, which is commercially available from Atlassian Pty Ltd., Sydney, Australia.

An ITS may be provided using a variety of different architectures. One implementation is a client server architecture where the ITS functionality is provided by a server computer and accessed by users from client computers. Two examples of a client server implementation are described generally below. Alternative implementations/architectures are, however, possible. For example, in the case of small enterprises with relatively simple requirements, an ITS may be a stand-alone implementation (i.e. on a single computer directly accessed/used by the end user).

In some embodiments, issue tracking systems manage the creation and tracking of issues in a variety of contexts. As one example, an issue tracking system may be deployed for use by a helpdesk. A busy helpdesk may manage thousands, tens of thousands, or even more issues. Each issue may have a different priority, require different actions, be handled by different people, and/or be handled by multiple different people over its lifecycle. An issue tracking system may be used to assist in managing and tracking this process. When a problem is submitted to the helpdesk an issue is created and assigned (at times with a particular priority). As the issue is worked on by various users, the progress of the issue is recorded and tracked by the issue tracking system until, ideally, the issue is solved and closed. At any point during the life of the issue (and/or for historical review purposes) the issue tracking system can be queried to access information on a given issue, such as its status, the actions that have been taken, who the issue is currently assigned to etc.

Some embodiments of issue tracking systems are implemented in a clustered architecture, typically in order to increase capacity for concurrent users to work with the system and the issues maintained by the system. In a clustered architecture an issue tacking system is implemented across multiple nodes, each node of the cluster running its own instance of the issue tracking system. While end users see and interact with a single issue tracking system, any given operation may, in fact, be performed by any of the system nodes. A clustered architecture increases the complexity of issue ranking. For example, in order to effectively implement a ranking functionality, the issue tracking system should be able to handle multiple concurrent modifications of the same issue (and closely ranked issues) by different users on different nodes of the cluster without the rank order of the issues being corrupted.

Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
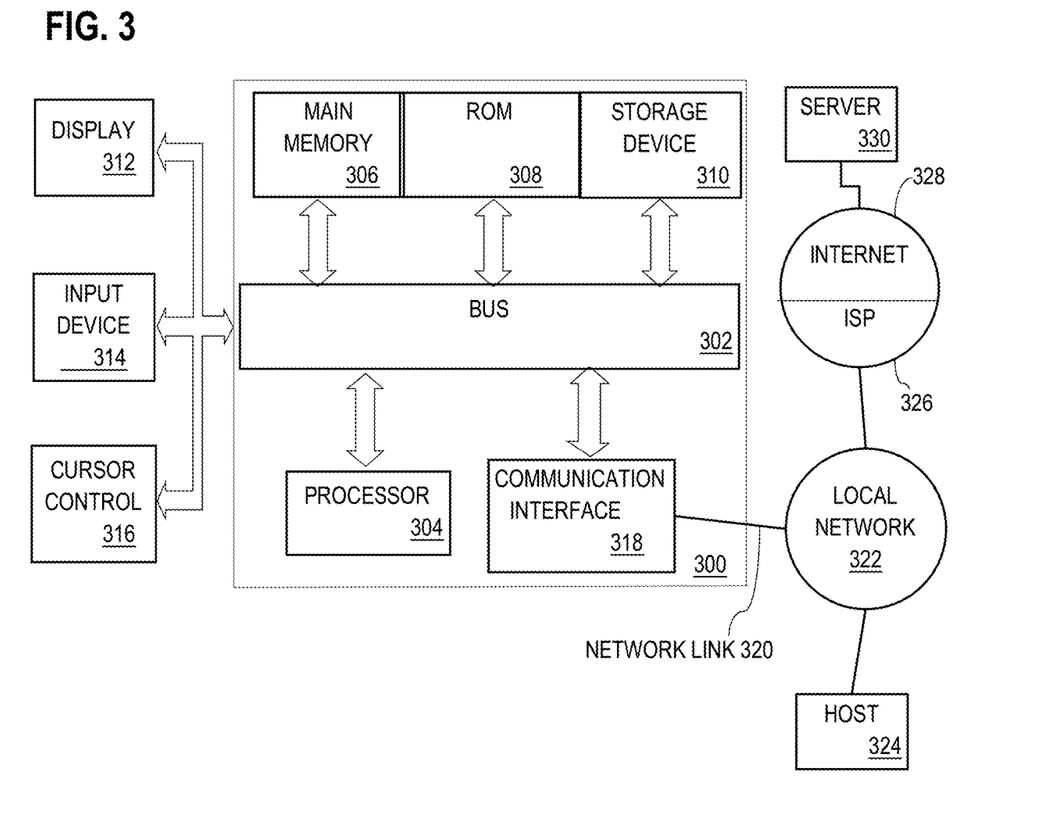
FIG. 3 depicts example hardware for digital task management using an intermediary single-account issue inbox system.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as an OLED, LED or cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane. The input device 314 may also have multiple input modalities, such as multiple 2-axes controllers, and/or input buttons or keyboard. This allows a user to input along more than two dimensions simultaneously and/or control the input of more than one type of action.

Computer system 300 may implement the techniques described herein using customized hard-wired logic, one or more ASICs or FPGAs, firmware and/or program logic which in combination with the computer system causes or programs computer system 300 to be a special-purpose machine. According to some embodiments, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Such a wireless link could be a Bluetooth, Bluetooth Low Energy (BLE), 802.11 WiFi connection, or the like.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
    an intermediary single-account issue inbox system accessible by a user account and comprising a non-transitory storage;
    an electronic mail server; and
    a shared issue tracking system coupled to the intermediary single-account issue inbox system via a network, wherein:
        the electronic mail server is configured to:
            receive an email message comprising message information and indicating the user account; and
            in response to identifying the user account, transmit the email message to the intermediary single-account issue inbox system associated with the user account;
        the intermediary single-account issue inbox system is configured to:
            receive the email message from the electronic mail server, the email message accessible by the user account;
            in response to receiving the email message, create a task item that includes at least a portion of the message information;
            assign the task item with an initial state value;
            in response to creating the task item, transmit at least the portion of the message information of the email message to the shared issue tracking system to cause creation of a ticket having an assignee and a digital state value, the assignee corresponding to a user of the user account and the digital state value corresponding to the initial state value;
            receive, from a user device associated with the intermediary single-account issue inbox system, a state change indication for the task item at the intermediary single-account issue inbox system;
            in response to receiving the state change indication, convert the initial state value of the task item to a subsequent state value; and
            transmit a state change message indicative of the state change indication to the shared issue tracking system to cause a change in the digital state value of the ticket in the shared issue tracking system, the change in the digital state value corresponding to converting the initial state value to the subsequent state value; and
        the shared issue tracking system is configured to:
            in response to receiving at least the portion of the message information of the email message, create the ticket having the assignee and the digital state value;
            in response to receiving the state change message, change the digital state value of the ticket; and
            in response to authorizing a particular user of a set of registered users registered with the shared issue tracking system, enable editing of the ticket using a client application configured to interface with the shared issue tracking system.

2. The system of claim 1, wherein the intermediary single-account issue inbox system is further configured to:
    prior to receiving the state change indication, cause display of the task item within a first list of task items, each task item of the first list of task items assigned with the initial state value; and
    after receiving the state change indication, cause display of the task item within a second list of task items, each task item of the second list of task items assigned with the subsequent state value.

3. The system of claim 1, wherein:
    the initial state value is one of a worklist state value or a follow up state value;
    the subsequent state value is an archive state value; and
    in response to receiving the state change indication, the task item is converted from the one of the worklist state value or the follow up state value to the archive state value.

4. The system of claim 1, wherein:
    the subsequent state value is one of a worklist state value or a follow up state value; and
    in response to receiving the state change indication, the task item is converted from the initial state value to the one of the worklist state value or the follow up state value.

5. The system of claim 1, wherein the intermediary single-account issue inbox system is further configured to:
    receive a project-identification interaction indication associating the task item with a project identifier; and
    in response to receiving the project-identification interaction indication, create an association between the task item and the project identifier.

6. The system of claim 5, wherein:
the task item is one of a list of task items;
the project identifier is associated with a subset number of task items of the list of task items; and
the intermediary single-account issue inbox system is further configured to cause display of the subset number of task items that are associated with the project identifier.

7. The system of claim 1, wherein the intermediary single-account issue inbox system is further configured to:
receive a message-association interaction indication indicating an association of the task item with an intermediary digital message; and
in response to receiving the message-association interaction indication, create a digital association between the task item and the intermediary digital message.

8. The system of claim 7, wherein:
the task item is one of a list of task items;
the intermediary digital message is associated with a subset number of task items of the list of task items; and
the intermediary single-account issue inbox system is further configured to cause display of the subset number of task items that are associated with the intermediary digital message.

9. A method comprising:
receiving, at an electronic mail server, an email message comprising message information;
in response to identifying a user account associated with the email message, transmitting the email message to an intermediary single-account issue inbox system associated with the user account;
receiving, at the intermediary single-account issue inbox system, the email message;
in response to receiving the email message, creating a task item that includes at least a portion of the message information;
assigning the task item with an initial state value;
in response to creating the task item, transmitting at least the portion of the message information of the email message to a shared issue tracking system to cause creation of a ticket having an assignee and a digital state value, the assignee corresponding to a user of the user account and the digital state value corresponding to the initial state value, the ticket accessible and editable through use of the shared issue tracking system, independently from the intermediary single-account issue inbox system, by a group of user accounts registered with the shared issue tracking system;
receiving, from the user account associated with the intermediary single-account issue inbox system, a state change indication for the task item at the intermediary single-account issue inbox system;
in response to receiving the state change indication, converting the initial state value of the task item to a subsequent state value; and
transmitting a message indicative of the state change indication to the shared issue tracking system to cause a change in the digital state value of the ticket in the shared issue tracking system, the change in the digital state value corresponding to converting the initial state value to the subsequent state value.

10. The method of claim 9, further comprising:
prior to receiving the state change indication, causing display of the task item within a first list of task items, each task item of the first list of task items assigned with the initial state value; and
after receiving the state change indication, causing display of the task item within a second list of task items, each task item of the second list of task items assigned with the subsequent state value.

11. The method of claim 9, wherein:
the initial state value is one of a worklist state value or a follow up state value;
the subsequent state value is an archive state value; and
in response to receiving the state change indication, the task item is converted from the one of the worklist state value or the follow up state value to the archive state value.

12. The method of claim 9, wherein:
the subsequent state value is one of a worklist state value or a follow up state value; and
in response to receiving the state change indication, the task item is converted from the initial state value to the one of the worklist state value or the follow up state value.

13. The method of claim 9, further comprising:
receiving a project-identification interaction indication associating the task item with a project identifier; and
in response to receiving the project-identification interaction indication, creating an association between the task item and the project identifier.

14. The method of claim 13, wherein:
the task item is one of a list of task items;
the project identifier is associated with a subset number of task items of the list of task items; and
the method further comprises causing display of the subset number of task items that are associated with the project identifier.

15. The method of claim 9, wherein:
the subsequent state value is an archive state value;
converting the initial state value of the task item to the subsequent state value includes changing the initial state value of the task item to the archive state value; and
in response to changing the initial state value of the task item to the archive state value, the method further comprises deleting the ticket from the shared issue tracking system.

16. The method of claim 9, wherein:
the task item is one of a list of task items;
the method further comprises sorting the list of task items according to a priority metric; and
tasks of the list of task items having a higher priority are placed higher in the sorted list of task items.

17. A method comprising:
receiving, at an electronic mail server, an email message for a user account and comprising message information;
transmitting the email message to an intermediary single-account issue inbox associated with the user account;
receiving the email message at the intermediary single-account issue inbox associated with the user account;
in response to receiving the email message, creating a task item that includes at least a portion of the message information;
assigning the task item with an initial state value;
in response to creating the task item, transmitting at least the portion of the message information, or information derived therefrom, of the email message to a shared issue tracking system to cause creation of a ticket, the ticket accessible and editable through use of the shared issue tracking system by a group of user accounts registered with the shared issue tracking system;

receiving, at the intermediary single-account issue inbox, a state change indication for the task item;

in response to receiving the state change indication, converting the initial state value of the task item to a subsequent state value; and transmitting at least a portion of the state change indication, or information derived therefrom, to the shared issue tracking system to cause a change in the digital state value of the ticket in the shared issue tracking system, the change in the digital state value corresponding to converting the initial state value to the subsequent state value.

18. The method of claim 17, wherein:

the ticket includes a project identifier; and the method further comprises associating the project identifier with the task item.

19. The method of claim 17, further comprising:

prior to receiving the state change indication, causing display of the task item within a first list of task items, each task item of the first list of task items assigned with the initial state value; and after receiving the state change indication, causing display of the task item within a second list of task items, each task item of the second list of task items assigned with the subsequent state value.

20. The method of claim 17, wherein:

the subsequent state value is an archive state value;

converting the initial state value of the task item to the subsequent state value includes changing the initial state value of the task item to the archive state value; and in response to changing the initial state value of the task item to the archive state value, the method further comprises deleting the ticket from the shared issue tracking system.

* * * * *